(12) United States Patent
Bogaerts et al.

(10) Patent No.: US 8,828,896 B2
(45) Date of Patent: Sep. 9, 2014

(54) SODA-LIME-SILICA GLASS-CERAMIC MATERIAL

(75) Inventors: Michel Bogaerts, Jumet (BE); Stephane Godet, Brussels (BE)

(73) Assignees: AGC Glass Europe, Brussels (BE); Universite Libre de Bruxelles, Brussels (BE)

( * ) Notice: Subject to any disclaimer, the term of this patent is extended or adjusted under 35 U.S.C. 154(b) by 174 days.

(21) Appl. No.: 13/500,226

(22) PCT Filed: Oct. 26, 2010

(86) PCT No.: PCT/EP2010/066118
§ 371 (c)(1),
(2), (4) Date: Apr. 4, 2012

(87) PCT Pub. No.: WO2011/051258
PCT Pub. Date: May 5, 2011

(65) Prior Publication Data
US 2012/0202676 A1    Aug. 9, 2012

(30) Foreign Application Priority Data

Oct. 26, 2009   (EP) .................................... 09174018

(51) Int. Cl.
| C03C 10/00 | (2006.01) |
| C03C 10/14 | (2006.01) |
| C03C 3/078 | (2006.01) |
| C03C 4/00  | (2006.01) |

(52) U.S. Cl.
CPC ............. C03C 10/0009 (2013.01); C03C 3/078 (2013.01); C03C 4/005 (2013.01)
USPC ................................................. 501/4; 501/2

(58) Field of Classification Search
USPC .................................................. 501/2, 4, 5, 6
See application file for complete search history.

(56) References Cited

U.S. PATENT DOCUMENTS

| 1,203,930 | A |   | 11/1916 | Steinmetz |
| 3,445,252 | A |   | 5/1969  | MacDowell |
| 3,645,711 | A |   | 2/1972  | Pirooz |
| 3,819,387 | A | * | 6/1974  | Leger et al. ....................... 501/4 |
| 4,233,169 | A | * | 11/1980 | Beall et al. ................. 252/62.59 |
| 5,455,207 | A | * | 10/1995 | Hagg .............................. 501/3 |
| 5,744,208 | A | * | 4/1998  | Beall et al. .................... 428/64.1 |
| 6,130,178 | A | * | 10/2000 | Andrus et al. ..................... 501/3 |
| 7,172,649 | B2 | * | 2/2007 | Conrad et al. .................. 106/35 |

FOREIGN PATENT DOCUMENTS

| GB | 1 203 469   | 8/1970  |
| JP | 57 183335   | 11/1982 |
| JP | 4 055 342   | 2/1992  |
| JP | 2003 261353 | 9/2003  |

OTHER PUBLICATIONS

International Search Report issued on Jan. 26, 2011 in PCT/EP10/066118 filed on Oct. 26, 2010.
U.S. Appl. No. 13/500,021, filed Apr. 3, 2012, Bogaerts, et al.

* cited by examiner

*Primary Examiner* — Noah Wiese
(74) *Attorney, Agent, or Firm* — Oblon, Spivak, McClelland, Maier & Neustadt, L.L.P.

(57) ABSTRACT

The invention relates to a glass-ceramic material having $SiO_2$, $Na_2O$ and CaO as main components and comprising crystalline particles of $SiO_2$ dispersed homogeneously in the volume of an amorphous matrix. Such a material has good mechanical strength, in particular good resistance to scratch propagation and allows improved tempering. This material furthermore has a pleasant aesthetic appearance.

15 Claims, 1 Drawing Sheet

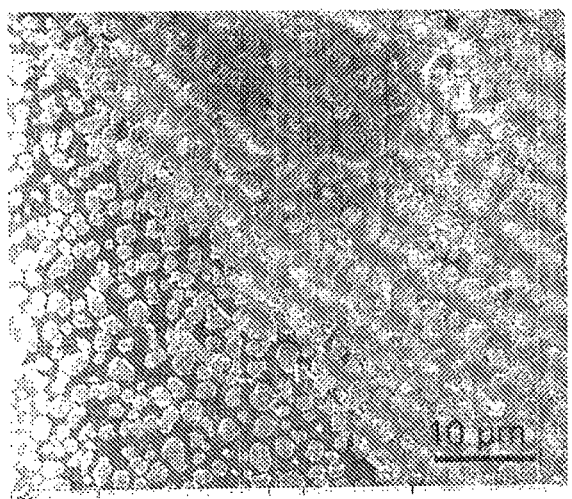

SODA-LIME-SILICA GLASS-CERAMIC MATERIAL

1. FIELD OF THE INVENTION

The field of the invention is that of glassy materials in the soda-lime-silica system. More precisely, the invention relates to a soda-lime-silica glass-ceramic material which has good mechanical strength, in particular good resistance to scratch propagation, and which allows an improved tempering. The material according to the invention has these properties coupled with a pleasant aesthetic appearance.

2. DESCRIPTION OF THE PRIOR ART

Glass, in its broadest definition, is a material which is amorphous, free of crystalline order and isotropic. During the manufacture of such a type of amorphous material comprising constituents of a crystallizable compound, a crystallization phenomenon, known as devitrification, may occur. In the particular case of soda-lime-silica glass, the composition of the glass has been optimized over decades in order to limit this unwanted phenomenon. Indeed, when a crystallization occurs accidentally or in an uncontrolled manner, it leads to the formation of crystals that are relatively large, of very diverse sizes and that are distributed heterogeneously in the glassy matrix, often in the form of needles at the surface. The presence of such crystals results in an optical defect (reduction of the transparency) and/or a mechanical defect (reduction of the resistance to mechanical stresses) of the resulting glass.

Nevertheless, the absence of microstructural interfaces of amorphous inorganic glasses leads to poor mechanical properties. This intrinsic mechanical brittleness results in low resistances to mechanical impacts. In particular, the aesthetic appearance of the glass is often greatly deteriorated by the formation of scratches or abrasions during the use thereof and/or the transport thereof. Furthermore, even if a glass is hard, it is brittle and not very tough, that is to say that it is not resistant to the propagation of scratches following the absence of discontinuities and of grain boundaries.

Equally, a soda-lime-silica glass, which does not conduct heat very well, registers high expansion at the location where it is heated. The expanded glass exerts a pressure on the surrounding parts which leads to rupture of the glass object, that is to say "thermal breakage".

These days, the thermal "tempering" of glass, very widely used in the soda-lime-silica glass industry, makes it possible to improve the mechanical strength and thermal resistance.

Unfortunately, this heat treatment, once carried out, does not allow the subsequent cutting of the product if it is in the form of a sheet, for example. In this case, it is important that the machining and the final edging be carried out before the tempering. The latter point represents a major drawback for glass products requiring improved mechanical strength, such as tiled floors or worktops, and which often require cutting for the placement thereof. Furthermore, the tempering of a soda-lime-silica glass is tricky or even impossible for glass known as "thin glass", that is to say glass in the form of a sheet having a thickness approximately less than 2.5 mm. Indeed, the compressive stress at the surface of the order of 100 MPa induced by the tempering is impossible for such glass sheets. This limitation originates from the value of the coefficient of thermal expansion CTE of the soda-lime-silica glass, of the order of $90 \times 10^{-7}/°C$.

It is however well known, in the world of glassy materials, that the tempering is facilitated when the CTE increases. A higher CTE value for the soda-lime-silica glass would thus enable an improved tempering and would give access to tempered thin glass.

One known way of improving the mechanical strength of a glass, and in particular its resistance to scratch propagation, is the application of a surface layer deposited on the glass. This technique aims to benefit from the specific mechanical strength of said layer with respect to an external mechanical stress. Nevertheless, the thickness of the protective layer is limited and any macroscopic scratch exposes unprotected glass to the exterior surroundings or leads to the creation of crack initiation in an embrittled region of the glass. Furthermore, the deposition of such a layer only improves the resistance to scratch propagation of the glass and does not modify its coefficient of thermal expansion in any way.

In the field of glassy materials, glasses comprising an amorphous glassy phase and a crystalline phase are well known in the art. These glasses result from the controlled homogeneous devitrification of a glass. The conversion to a semi-crystalline ceramic, also known as a glass-crystalline material or commonly as a glass-ceramic material, is obtained from a glass via controlled heat treatment which makes it possible to produce a high density of small crystals dispersed homogeneously in the volume of the material. Unlike uncontrolled devitrification, this homogeneous distribution of the crystals makes it possible to improve the mechanical properties of the product. Indeed, certain glass-ceramics have a high scratch resistance and a high tensile strength and also an absence of expansion at high temperature, which makes them practically invulnerable to heat shocks.

On the basis of these properties, numerous applications have been developed for such types of glass. Glass-ceramic is, for example, used for the manufacture of hobs or chimney walls.

For decades and since the breakthrough of glass-ceramics onto the market in the middle of the 1950s, several companies have developed glass-ceramics based on the partial crystallization of a glass. Known compositions are based, for example, on $Li_2O$—$SiO_2$ (silicate) systems or $Li_2O$—$Al_2O_3$—$SiO_2$ (aluminosilicate) systems. Moreover, they often have one or more nucleating agents such as $TiO_2$, $ZrO_2$ or $P_2O_5$.

While many known glass-ceramic materials have mechanical strength and heat resistance properties far greater than the amorphous soda-lime-silica glass, they nonetheless remain much more expensive to produce and hence cannot be transposed to standard applications for economical reasons. Owing to its ease of production and to the low cost price of the raw materials, soda-lime-silica glass specifically retains a predominant position in the glass industry and in particular for the building, motor vehicle and decoration markets.

Hence, there is an obvious economic advantage in producing a soda-lime-silica material having increased mechanical properties, in particular good resistance to scratch propagation, and which allows improved tempering.

Moreover, glass known as "opal glass" comprising a glassy phase and a crystalline phase are also well known in the art and are obtained by introducing an opacifier, conventionally fluorides, into a silicate, an aluminosilicate or a borosilicate, via an intentional or controlled crystallization of crystals (in the case of the addition of fluorides, the crystals are conventionally $CaF_2$ or $NaF$). Opal glass, highly present in everyday life, is opaque and diffuses light. It is therefore mainly used in decorative applications and in the manufacture of consumer products such as tableware or light fittings. Conventional opal glass, sold under the trade mark Arcopal®, is milky white and is a fluorosilicate. Nevertheless, the introduction of conventional opacifiers such as fluorides into glass compositions presents two major drawbacks: (i) an undeniable negative impact on the environment and (ii) an increased corrosion phenomenon of the refractory materials of the melting furnaces.

Hence there is also an interest in obtaining a soda-lime-silica material that has a pleasant aesthetic appearance, comparable to that of opal glass but which is free of fluorine.

3. OBJECTIVES OF THE INVENTION

One objective of the invention is, in particular, to overcome the drawbacks of the prior art by solving the technical problem, namely to obtain a soda-lime-silica material, that is to say belonging to the $Na_2O$—$CaO$—$SiO_2$ system, having increased mechanical properties, in particular good resistance to scratch propagation, and which also allows improved tempering.

Another objective of the invention is to provide a soda-lime-silica material having, in addition to the desired mechanical strength and to the fact that it allows improved tempering, the aesthetics desired as a function of the application for which it is intended. The invention proposes, in this context, to provide a soda-lime-silica material which is transparent or alternatively has a pleasant milky opaque appearance comparable to that of opal glass but without the addition of an opacifier.

Finally, one objective of the invention is to provide a solution to the disadvantages of the prior art which is simple, economical and has a low environmental impact.

4. SUMMARY OF THE INVENTION

In accordance with one particular embodiment, the invention relates to a glass-ceramic material having $SiO_2$, $Na_2O$ and CaO as main components.

According to the invention, the glass-ceramic material comprises crystalline particles constituted essentially of $SiO_2$ and dispersed homogeneously in the volume of an amorphous matrix.

Thus, the material according to the invention makes it possible to overcome the drawbacks of the materials from the prior art and to solve the stated technical problem. Specifically, the inventors have demonstrated that it was possible, contrary to the teaching of the prior art, to obtain a soda-lime-silica glass-ceramic material. Indeed, it is maintained in the scientific literature, and in particular in the article by Strnad et al., published in *Physics and Chemistry of Glasses* (Vol. 14, No. 2, April 1973), that it is impossible to produce a homogeneous crystallization in the volume of a glass belonging to this system and that only an uncontrolled heterogeneous crystallization may be obtained in this case. The prior art does not furthermore propose any glass-ceramic in the soda-lime-silica system comprising an amorphous phase and a crystalline phase dispersed homogeneously in the volume of said amorphous phase. On the contrary, the transparency necessary in common applications of soda-lime-silica glass (architecture, motor vehicles, etc.) has always led a person skilled in the art to envisage only amorphous materials and has always encouraged a person skilled in the art to optimize the composition of the glass and also the manufacturing process thereof in order to prevent or at least limit the unwanted devitrification phenomenon.

Furthermore, the inventors have demonstrated, very surprisingly, that a soda-lime-silica material of glass-ceramic type made it possible to achieve CTE values higher than a corresponding amorphous glass.

The soda-lime-silica glass-ceramic material according to the invention thus has an increased mechanical strength, in particular good resistance to scratch propagation, and it also allows improved tempering. The glass-ceramic material of the invention is, furthermore, economically and aesthetically acceptable for standard applications in the building industry, the motor vehicle industry, decoration or the manufacture of small bottles.

In accordance with one particular embodiment, the crystalline particles dispersed homogeneously in the volume of an amorphous matrix have a size between 5 nm and 500 µm. Preferably, in order to obtain a material which is transparent, the crystalline particles have a size between 5 nm and 500 nm. Preferably, in order to obtain a material that has a milky opaque appearance, comparable to that of opal glass, the crystalline particles have a size between 500 nm and 500 µm.

The invention also relates to a sheet constituted of the glass-ceramic material as described previously and also to an article comprising at least one such sheet.

The present invention will be described in greater detail and in a non-restrictive manner. The appended figure represents an image obtained by electron microscopy of a material in accordance with the invention.

5. DESCRIPTION OF AT LEAST ONE EMBODIMENT OF THE INVENTION

The material according to the invention is a glass-ceramic material. The term "glass-ceramic" is understood to mean a material which has both a glassy phase and a crystalline phase and which results from the controlled devitrification of a glass.

The material according to the invention is a soda-lime-silica material, that is to say a material that belongs to the $Na_2O$—$CaO$—$SiO_2$ system. The material of the invention hence has $SiO_2$, $Na_2O$ and CaO as main components. In particular, the material of the invention comprises, as a percentage by total weight, 60 to 85% of $SiO_2$, 1 to 25% of $Na_2O$ and 1 to 25% of CaO. Additionally, it may comprise other components in minor amounts such as $K_2O$, MgO, $Al_2O_3$, BaO, various dyestuffs or residues originating from additives that modify the redox ($NaNO_3$, $Na_2SO_4$, coke, etc.). Preferably, these components, if they are present in the material of the invention, will not exceed, in total, 15% by weight of the material.

According to one particular embodiment of the invention, the material is free of the element fluorine. Such a material hence has a low environmental impact, in particular compared to opal glass, the opacifier of which is conventionally based on fluorides. The expression "free of" means, in the present invention, that the material only comprises the element fluorine in trace amounts. Preferably, the material only comprises the element fluorine in an amount of less than 500 ppm by weight.

Again according to one particular embodiment of the invention, the glass is free of the element lithium. Since lithium oxide is more expensive than oxides such as $Na_2O$ and CaO, such a glass of soda-lime-silica type hence represents an undeniable economic advantage, in particular compared with glass-ceramic materials known from the prior art which comprise, usually, lithium oxide. The expression "free of the element lithium" means that the glass of the invention only comprises this element in trace amounts. Preferably, the glass only comprises the element lithium in an amount of less than 500 ppm by weight.

Alternatively, according to another particular embodiment of the invention, the glass may comprise lithium in amounts which may range up to around 3% by weight, expressed in the form of oxide. The presence of lithium in these amounts makes it possible to reduce the viscosity of the glass in the melt state and to thus favour the crystallization.

According to another preferred embodiment, the glass of the invention is free of the element lead. The expression "free of the element lead" means that the glass of the invention only comprises this element in trace amounts.

According to another preferred embodiment, the glass of the invention is free of the element boron. The expression "free of the element boron" means that the glass of the invention only comprises this element in trace amounts.

The material according to the invention comprises crystalline particles dispersed homogeneously in the volume of an amorphous matrix.

The material may comprise crystalline particles in the form of an assembly of several particles or in isolated form.

According to the invention, the crystalline particles have a size which is not less than 5 nm and which is not greater than 500 µm. The term "size" is understood to mean the largest dimension of the particles.

According to one particular embodiment of the invention, the crystalline particles have a size which is not less than 5 nm and which is not greater than 500 nm. Advantageously, due to the fact that the size of the particles is smaller than the wavelength range of the visible spectrum, the glass-ceramic material in accordance with this embodiment is transparent, in addition to having increased mechanical strength.

According to another particular embodiment of the invention, the crystalline particles have a size which is not less than 500 nm and which is not greater than 500 µm. Advantageously, due to the fact that the size of the particles falls within the wavelength range of the visible spectrum, the glass-ceramic material in accordance with this embodiment has, in addition to increased mechanical strength, a pleasant milky opaque appearance, comparable to that of opal glass.

The crystalline particles according to the invention are essentially constituted of $SiO_2$. Impurities, such as components originating from the composition of the material and that are essentially in the amorphous matrix, may be present therein in a minimal amount. If such impurities are present in the crystalline particles, they are preferably present in an amount of less than 5% by weight in total. More preferably, they are present in an amount of less than 2% by weight in total.

According to one particular embodiment of the invention, the crystalline particles are in the form of a single polymorph of this component. According to another particular embodiment of the invention, the crystalline particles are in the form of several $SiO_2$ polymorphs. The material according to the invention may also comprise particles according to each of the latter two embodiments.

Examples of an $SiO_2$ polymorph are quartz ($\alpha$ or $\beta$), cristobalite ($\alpha$ or $\beta$) or tridymite ($\alpha$ or $\beta$).

According to one embodiment of the invention, the crystalline particles of $SiO_2$ are essentially in the form of cristobalite.

The material of the invention comprises crystalline particles constituted essentially of $SiO_2$ and dispersed homogeneously in the volume of an amorphous matrix. By considering the composition as total weight of the material, this amorphous matrix is hence depleted in $SiO_2$ due to the presence of the crystalline particles.

The glass-ceramic material according to the invention has increased mechanical strength, in particular good resistance to scratch propagation, compared to a corresponding amorphous glass.

The mechanical strength of a material is often expressed in terms of hardness and toughness. The hardness characterizes the ability of a material to be scratched or abraded (expressed in MPa or GPa). The toughness is the ability of the material to withstand the propagation of an existing crack. The brittleness (B) may supplement these parameters and corresponds to the ratio between hardness (H) and toughness (Kc), H/Kc (expressed in $\mu m^{-0.5}$). In the present invention, the hardness and the brittleness are measured by Vickers indentation.

Preferably, the glass-ceramic material according to the invention has a brittleness of less than 6.5 $\mu m^{-0.5}$. By way of comparison, this value is around 7 $\mu m^{-0.5}$ for an amorphous soda-lime-silica glass, with no particular treatment.

Furthermore, the glass-ceramic material has a higher CTE than a corresponding amorphous glass.

The partial heating or partial cooling of a material may, if it has low thermal conductivity, lead to stresses which may give rise to thermal breakages, as is the case for soda-lime-silica glass.

The magnitude of this expansion or contraction phenomenon of a material respectively during partial heating or partial cooling is conventionally defined by the coefficient of linear thermal expansion. This coefficient of thermal expansion or CTE corresponds to the elongation per unit length for a variation of 1° C. (expressed as $°C.^{-1}$).

Preferably, the glass-ceramic material according to the invention has a CTE, measured for a temperature variation ranging from 25 to 300° C., which is greater than $100 \times 10^{-7}/°$ C. By way of comparison, the CTE, for the same range of temperatures, of an amorphous soda-lime-silica glass, with no particular treatment, is of the order of $90 \times 10^{-7}/°$ C.

Due to this higher CTE value, the material of the invention allows an improved tempering. A material that allows improved tempering is understood to be a material which requires, in order to obtain a compressive stress at the surface equivalent to that of a corresponding amorphous glass, tempering at a lower temperature and/or for a shorter time. Hence, this advantage permits an energy saving which results in an additional positive effect of the invention from an environmental and economic viewpoint. Similarly, material which allows improved tempering is also understood to mean a material which has, for equivalent heat treatment, a compressive stress at the surface which is greater than that of a corresponding amorphous glass. Finally, a material which allows improved tempering is also understood to mean a material which allows the tempering of "thin" sheets made from this material.

The soda-lime-silica glass-ceramic material according to the invention may be obtained by any process capable of generating crystalline particles of $SiO_2$ in the volume of an amorphous matrix.

In particular, the material according to the invention may be obtained by two routes: (i) a controlled heat treatment of the material in the melt state (ceramization), or (ii) a controlled annealing of a material of the same overall composition but solidified beforehand in the amorphous state.

In both cases, a heat treatment known as ceramization is carried out. Ceramization generally comprises, in a known manner, the following steps, which may be repeated several times:

a) raising the temperature up to the temperature T (ceramization plateau) which is situated beyond the nucleation range;
b) maintaining the temperature T for a time t;
c) rapid cooling down to ambient temperature.

The material according to the invention may be used for manufacturing articles of different shapes and sizes. It may, for example, be used for manufacturing bottles, globes for light fittings and decorative objects.

In particular, the glass-ceramic material of the invention may be used for manufacturing a sheet of said material. According to this embodiment, and due to its increased resistance to scratch propagation, it may for example be used for a worktop in a kitchen or a laboratory, for tables and shelves or as flooring (paving, walkway). Still in accordance with this embodiment, and due to the fact that the material also allows improved tempering, it may also be used to manufacture solar panels or motor vehicle glazing units.

An example of an article in accordance with the invention comprising more than one sheet of said glass-ceramic material is a wall which is "laminated" in order to improve the safety aspect, that is to say which comprises two sheets assembled by one or more plastic interlayer films.

Other details and advantageous features will emerge below from the description of non-limiting exemplary embodiments of a material according to the invention.

Examples

A composition $C_1$ comprises, as percentage by total weight, 80.3% of $SiO_2$, 10.3% of $Na_2O$ and 9.4% of CaO.

This composition was melted at a temperature of 1550° C. then poured into a 4 cm×4 cm mould having a height of one centimeter. The amorphous glass obtained by gradual cooling of the composition $C_1$ was then treated thermally by heating (annealing) at a temperature of 1000° C. for 1 h, followed again by a gradual cooling to ambient temperature. The material $M_1$ was obtained for the composition $C_1$.

The coefficient of linear thermal expansion (CTE), the hardness and the brittleness were evaluated for the material $M_1$. The hardness (H) and the brittleness (B) were determined by Vickers indentation (load: 0.5 kg, application time: 25 sec.) whilst the CTE was obtained using a dilatometer for a range of temperatures from 25 to 300° C. (ISO 7991:1987 standard). These techniques will not be explained further as they are well known to persons skilled in the art in the field of glassy and glass-ceramic materials.

These parameters were also evaluated for an amorphous glass $V_1$ obtained for the composition $C_1$ (without annealing). The values obtained are the following:

|  | V1 | M1 |
| --- | --- | --- |
| $CTE_{25\text{-}300}$ ($10^{-7} \cdot °C^{-1}$) | 74 | 120 |
| Hardness (GPa) | 4.9 | 4.8 |
| Brittleness ($\mu m^{-0.5}$) | 6.4 | 5.3 |

These results illustrate the fact that the material $M_1$ according to the invention has good mechanical strength, in particular good resistance to scratch propagation relative to a corresponding amorphous soda-lime-silica glass. They also show a coefficient of thermal expansion much higher than that of an amorphous soda-lime-silica glass.

Furthermore, the material of $M_1$ was also analysed by scanning electron microscopy and by X-ray diffraction. The figure represents an image obtained by scanning electron microscopy of the material $M_1$.

The analyses showed that this material comprises particles which are dispersed homogeneously in the volume of a matrix. The particles are crystalline and the matrix is amorphous. This material is hence a glass-ceramic material. The crystalline particles are crystals of $SiO_2$ in the form of cristobalite and they have a size which varies from around 0.5 μm to around 5 μm.

The material $M_1$ has an opaque and milky white appearance and hence has an aesthetic appearance comparable to that of fluorine-containing opal glass.

The invention claimed is:

1. A sheet comprising a glass-ceramic material, comprising:
   an amorphous matrix comprising, based on a total weight of the glass-ceramic material:
   from 60 to 85% of $SiO_2$;
   from 1 to 25% of $Na_2O$;
   from 1 to 25% of CaO;
   less than 500 ppm by weight of the element lithium; and
   crystalline particles consisting essentially of $SiO_2$,
   wherein the crystalline particles are dispersed homogeneously in a volume of the amorphous matrix, and
   wherein the sheet comprising a glass-ceramic material is free of the element fluorine.

2. The sheet comprising a glass-ceramic material of claim 1, being free of the element lead.

3. The sheet comprising a glass-ceramic material of claim 1, wherein the crystalline particles are in the form of an $SiO_2$ polymorph.

4. The sheet comprising a glass-ceramic material of claim 1, wherein the crystalline particles are in the form of cristobalite.

5. The sheet comprising a glass-ceramic material of claim 1, having a brittleness, measured by Vickers indentation, of less than 6.5 $\mu m^{-0.5}$.

6. The sheet comprising a glass-ceramic material of claim 1, having a coefficient of thermal expansion (CTE), measured for a temperature variation ranging from 25 to 300° C., greater than $100 \times 10^{-7}$/° C.

7. An article, comprising:
   the sheet of claim 1.

8. The sheet comprising a glass-ceramic material of claim 1, being free of the element boron.

9. The sheet comprising a glass-ceramic material of claim 1, wherein the amorphous matrix contains a maximum of 15% by weight of elements other than $SiO_2$, $Na_2O$, and CaO.

10. A sheet comprising a glass-ceramic material, comprising:
    an amorphous matrix comprising, based on a total weight of the glass-ceramic material:
    from 60 to 85% of $SiO_2$;
    from 1 to 25% of $Na_2O$;
    from 1 to 25% of CaO;
    less than 500 ppm by weight of the element lithium; and
    crystalline particles consisting essentially of $SiO_2$,
    wherein the crystalline particles are dispersed homogeneously in a volume of the amorphous matrix, and
    wherein the crystalline particles have a size between 5 nm and 500 μm.

11. The sheet comprising a glass-ceramic material of claim 10, wherein the crystalline particles have a size between 5 nm and 500 nm.

12. The sheet comprising a glass-ceramic material of claim 10, wherein the crystalline particles have a size between 500 nm and 500 μm.

13. A sheet comprising a glass-ceramic material, comprising:
    an amorphous matrix comprising, based on a total weight of the glass-ceramic material:
    from 60 to 85% of $SiO_2$;
    from 1 to 25% of $Na_2O$;

from 1 to 25% of CaO;
less than 500 ppm by weight of the element lithium;
less than 500 ppm by weight of the element fluorine; and
crystalline particles consisting essentially of $SiO_2$,
wherein the crystalline particles are dispersed homogeneously in a volume of the amorphous matrix.

14. The sheet comprising a glass-ceramic material of claim 13, wherein the crystalline particles have a size between 5 nm and 500 nm.

15. The sheet comprising a glass-ceramic material of claim 13, wherein the crystalline particles have a size between 500 nm and 500 µm.

* * * * *